Sept. 26, 1967  A. L. SEIFRIED  3,343,740
BELT RECORD TRANSPORT MECHANISM FOR DICTATING MACHINES
Filed Oct. 22, 1965  2 Sheets-Sheet 1

INVENTOR
ALBERT L. SEIFRIED

BY George H. Fritzinger
AGENT

Sept. 26, 1967     A. L. SEIFRIED     3,343,740

BELT RECORD TRANSPORT MECHANISM FOR DICTATING MACHINES

Filed Oct. 22, 1965     2 Sheets-Sheet 2

INVENTOR
ALBERT L. SEIFRIED

BY George H. Fritzinger
AGENT

United States Patent Office 3,343,740
Patented Sept. 26, 1967

3,343,740
BELT RECORD TRANSPORT MECHANISM FOR DICTATING MACHINES
Albert L. Seifried, Mendham, N.J., assignor to McGraw-Edison Company, Elgin, Ill., a corporation of Delaware
Filed Oct. 22, 1965, Ser. No. 501,657
5 Claims. (Cl. 226—189)

This invention relates to a roller mounting for a flexible belt record in a dictating machine, and more particularly its relates to improvements in such roller mounting which causes the belt record to tend always to stay in a fully mounted position along the rollers during both forward and reverse drive of the belt record.

It is an object to provide an improved roller mounting for a belt record, which tends inherently to maintain the belt record in a fully mounted position without the use of any extra parts.

Another object is to provide such an improved roller mounting which requires no extra shifting of any parts when a record is changed.

It is another object to provide such an improved roller mounting which is operative equally well to maintain the belt record in a fully mounted position during both forward and reverse drive of the belt record.

Another object is to provide such an improved roller mounting which causes the belt record to tend always to "walk" in a direction towards a fully mounted position.

These and other objects and features of the invention will be apparent from the following description and the appended claims.

In the description of the invention reference is had to the accompanying drawings of which:

Figure 2:
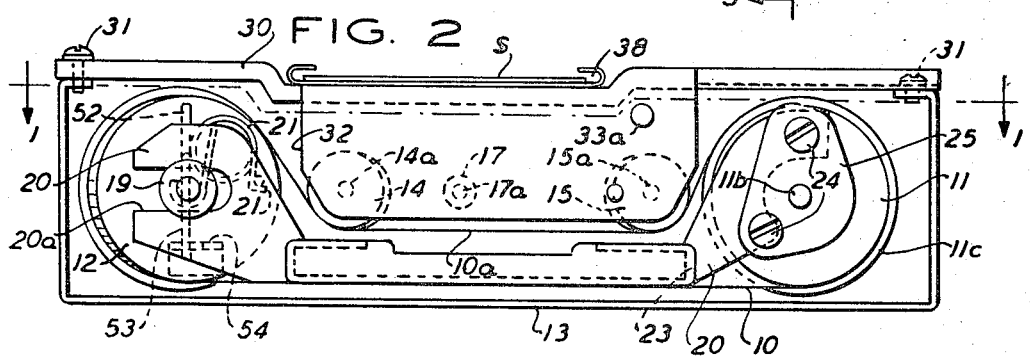
FIGURE 2 is a right-hand end view to larger scale of the machine shown in FIGURE 1.
Figure 3:
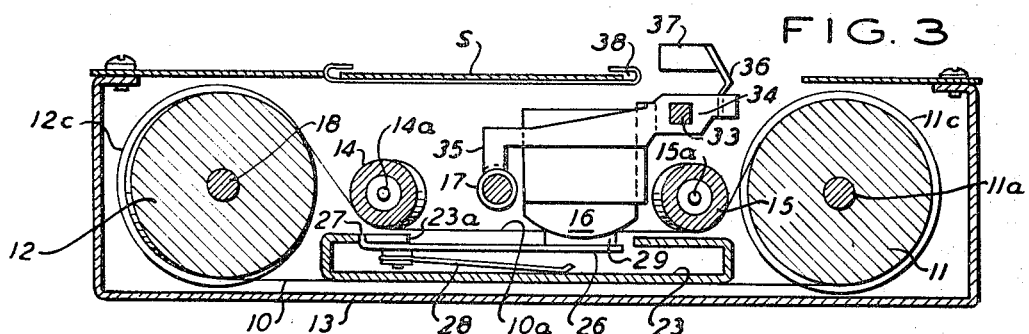
FIGURE 3 is a left-hand sectional view also to larger scale taken in the line 3—3 of FIGURE 1.

The dictacting machine shown in the accompanying figures is of the type using a magnetic belt record 10. The transport mechanism for the belt record is in a right-half portion of the machine and comprises a rearward drive roller 11 and a forward take-up roller 12. As shown in FIGURES 2 and 3, the belt record is led from the under side of the rearward drive roller 11 in parallel relation to the base of the housing 13 to the under side of the front take-up roller 12, and is led back from the front take-up roller to the drive roller below two spaced idler rollers 14 and 15. The idler rollers are journaled at a level wherein the medial plane through the axes of the idler rollers is even below that of the drive and take-up rollers to cause the belt record to wrap around major portions of the drive and take-up rollers and to provide a run 10a of the record which is depressed to a level only slightly above the bottom run. It is across the top side of the run 10a of the belt record that a magnetic head 16 is driven by a feed screw 17 to describe a helical track on the belt record as the drive roller is rotated.

There is provided a through shaft 18 for the take-up roller 12 on which the take-upe roller rotates. This shaft is secured at its end portions in bearings 19 which are slidably mounted in open ended slots 20a and 22a provided in parallel frame members 20 and 22 at opposite ends of the drive and take-up rollers. The bearings 19 are biased forwardly by torision springs 21 to hold the belt record under tension. To remove the belt record from the machine the front take-up roller is shifted rearwardly to relieve the tension so that the belt record will slide easily off of the drive and take-up rollers. Likewise, when a record is to be mounted on the transport mechanism the front take-up roller is shifted rearwardly and the belt record is slid onto the rollers until the inner edge thereof strikes against flanges 11c and 12c on the drive and take-up rollers to define a fully mounted position of the belt record. When the belt record reaches such fully mounted position the front take-up roller 12 is released to place the belt record again under tension.

The frame member 22 constitutes the left sidewall of the housing 13 for the transport mechanism. This is a heavy frame member on which is mounted in cantilever fashion a hollow rigid channel-shaped frame member 23 which extends righwardly through the space between the mandrels and through the space between the top and bottom runs of the belt record to the right end of the machine. Secured rigidly as by brazing to the right end of this channel frame member 23 is the bridge member 20 which is slotted at its forward end portion as beforementioned to carry an end bearing 19 for the front take-up roller. The rearward portion of the bridge member 20 overlaps the end of the drive mandrel and is secured by screws 24 to an oval-shaped plate 25 which carries a bearing for the right end of a shaft 11b for the drive roller.

Within the hollow channel frame member 23 is a plate 26 extending throughout the width of the belt record. This plate has a pair of lugs turned upwardly at its forward edge which engage apertures in a top flange 23a of the channel frame member to form pivot points 27 for the plate. The plate is biased upwardly by cantilever spring 28 which bears against the bottom wall of the channel frame member. On the plate 26 is a felt pad 29 which extends upwardly through a slot in the channel frame member. This felt pad extends throughout the width of the belt record and is biased upwardly under influence of the cantilever spring 28 to form a yieldable backing for the portion of the run 10a of the belt record which is engaged by the magnetic head 16.

Bridging the top of the housing 13 is a heavy bracket 30 secured in place by screws 31. From the central portion of this bracket there is a depending plate 32 having bearings 14a and 15a for the right ends of the idler rollers 14 and 15, a bearing 17a for the feed screw 17 and a bearing 33a for a rock shaft 33 of square cross section on which a carriage 34 for the magnetic head 16 is splined. The bearings for these parts at the left side of the belt record are supported suitably by the frame member 22. The head carriage 34 is biased by its own weight to hold a free nut 35 thereon in engagement with the feed screw. A finger 36 extends upward from the rear portion of the head carriage through a slot in the top wall of the housing and carries a finger-piece or button 37 which when pressed rearwardly raises the feed nut from the feed screw to permit the carriage to be shifted by hand. On the top face of the housing 13 ahead of the finger-piece 37 there is a channel 38 for receiving slidably an index slip S on which length and correction marks may be made to aid the transcribed in reproducing the dictation, as is well known in the art.

The take-up roller 12 is shiftable rearwardly against the springs 21 in parallel relation to the drive roller 11, to allow a belt record 10 to be mounted thereon and removed therefrom, by means of a parallel rocker arrangement comprising vertical pins 52 and 53 at the left and right ends of the roller 12 which traverse the shaft 18 and extend downwardly through slotted lugs 54 on the inner sides of the frame members 20 and 22. The pin 52 at the inner end of the take-up roller 12 has an upwardly extending portion by which the pin can be rocked rearwardly as by hand or through suitable linkage not shown. When the pin 52 is so rocked to shift the left end of the take-up roller it turns the shaft 18 causing the take-up roller to be shifted likewise at its outer end through the pin 53.

Figure 1:
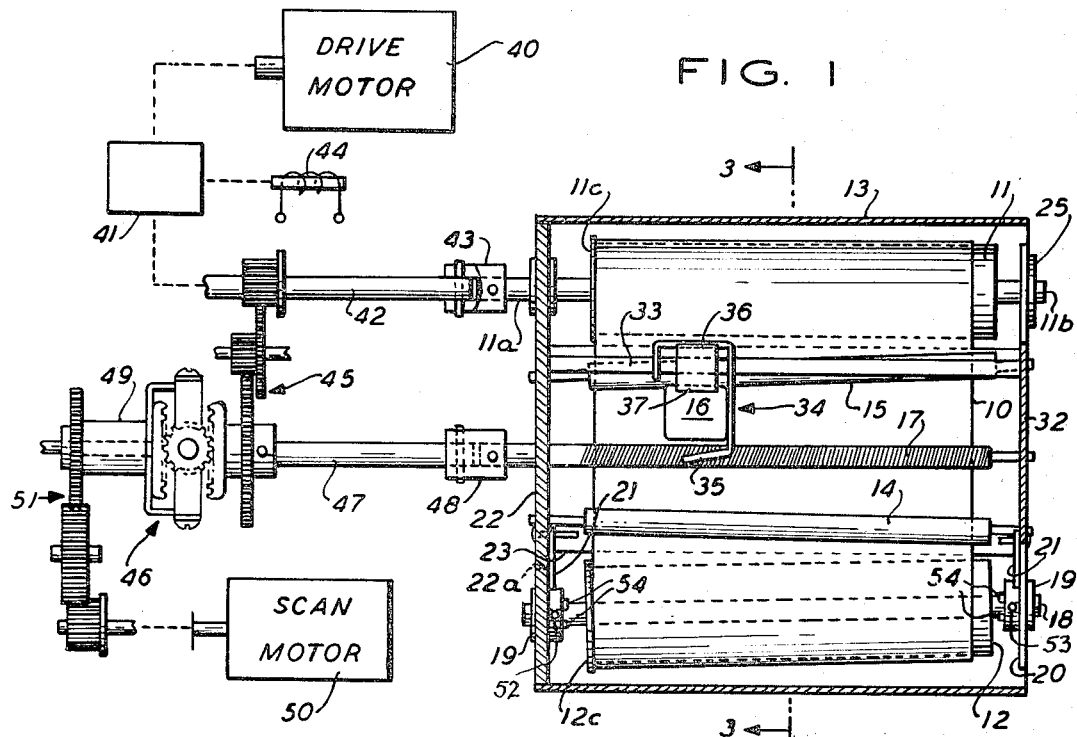
FIGURE 1 is a fractional top plan view of a dictating machine incorporating one embodiment of the invention showing some parts in section on the line 1—1 of FIGURE 2.

At the left side of the vertical frame plate 22 there is a drive mechanism for the belt record 10 and head carriage 34 which is shown largely diagrammatically in FIGURE 1. This drive mechanism may be of the form shown in United States Patent No. 3,222,074, dated Dec. 7, 1965, and to which reference may be had as to details of construction. For the present purposes the showing and description may be simplified. Suffice to say the drive mechanism comprises a reversible drive motor 40 coupled through a shiftable drive transmission 41 to a shaft 42 connected through a universal joint 43 to the shaft 11b of the drive roller 11. The drive transmission 41 is provided with suitable one-way clutches and other drive clutches controlled by a clutch solenoid 44 so that the drive motor 40 can drive the shaft 42 at a normal forward speed when the motor is rotating in a forward direction and the clutch solenoid 44 is de-energized, in a fast forward direction when the motor is reversed and the clutch solenoid 44 is still de-energized, and in a fast reverse direction when the motor 40 is reversed and the clutch solenoid 44 is energized.

The shaft 42 is also coupled through a gear train 45, differential gear mechanism 46, shaft 47 and universal joint 48 to the feed screw 17. Journaled on the shaft 47 at the outer end of the differential gear mechanism 46 is a collar 49. When this collar is held stationary, drive power is transmitted from the drive motor 40 to the feed screw 17 to cause the head carriage 34 to receive a slow forward or reverse traveling movement in fixed relation to the forward or reverse drive of the belt record 10. On the other hand, when the drive motor 40 is at standstill the carriage can be moved in forward and reverse directions at a relatively fast speed—herein referred to as a scan movement—by a reversible scan motor 50 coupled to the collar 49 through a gear train 51. Movements of the head carriage 34 from the drive motor 40 are in-track movements wherein the record-reproduce head 16 describes a helical track on the belt record 10. However, movements of the head carriage from the scan motor 50 are cross-track movements because of the belt record 10 being then at standstill.

In the normal use of a dictating machine the operator will selectively shift the drive mechanism between normal forward in-track operation, fast forward and fast reverse in-track operation, as well as between fast and reverse scan operation. The driving of the belt record 10 in both forward and reverse directions creates a problem in preventing so-called "walking" of the belt record along the drive and take-up rollers 11 and 12. In machines wherein the belt record is driven only in a forward direction the "walking" problem has been prevented heretofore by engaging the outer surface of the belt record where it is trained around the drive roller with a friction roller inclined in a direction to exert a constant longitudinal thrust on the belt record tending to push it against the flange 11c at the inner end of the drive roller. Obviously, such friction roller will have the reverse effect tending to move the belt record off of the drive roller when the belt record is driven in a reverse direction. Further, the use of such friction roller is undesirable in that it has to be lifted from the drive roller to permit the belt record to be changed.

The present invention resides in a simple modification of the roller transport mechanism for the belt record 10, which is adapted to cause the record to seek a fully mounted position during both its forward and reverse movements. Moreover, the present invention does not utilize any additional parts nor does it require the shifting of any additional parts to permit the belt record to be removed and a new record to be mounted on the transport mechanism. In its broader aspects, the invention resides in skewing—i.e., in inclining or tapering—the two idler rollers 14 and 15 so that when the take-up roller 12 is released and moved by the springs 21 to tension the belt record 10, the take-up roller will be inclined towards the drive roller 11 at its outer end. The inner end of the take-up roller 12 becomes therefore a "high" end, which will tend to cause the belt record always to "walk" inwardly and maintain its inner edge in abutment against the flange 12c of the take-up roller especially since the belt record is trained around substantially more than fifty percent of the take-up roller by reason of the guide roller 14 being set downwardly with its axis below the level of that of the take-up and drive rollers.

In the preferred embodiment the invention is carried out simply by inclining the idler rollers 14 and 15 towards the respective take-up and drive rollers 12 and 11 at their outer ends. This results in the outer ends of the idler rollers 14 and 15 being closer to the respective take-up and drive rollers typically by about .015" than are their inner ends. The effect of this skewing causes the flat bottom run 10a of the belt record to be a little longer (by about .030") at the outer or load end of the rollers than it is at the inner ends of the rollers. Since the bearings for the take-up roller 12 are slidingly mounted and the take-up roller upon its release tensions the belt record in response to the springs 21, the take-up roller 12 assumes an oblique position wherein its outer end is closer to the drive roller than is its inner end. Therefore, the inner end of the take-up roller is always a so-called "high" portion of the roller whether the record is driven in a forward or reverse direction. Since a flat belt always tends to "climb" or "walk" towards the "high" end of a roller or pulley around which it is trained, the belt record always seeks to move inwardly towards its fully mounted position defined by abutment of the inner edge of the belt record against the rim flanges 11c and 12c on the drive and take-up rollers. It is found in practice that the inherent tendency in this construction to maintain the belt record in a fully mounted position is a positive and dependable action. Further, the invention is carried out without any complication in the structure and without the need to shift any additional parts to permit the record to be changed.

Figure 4:
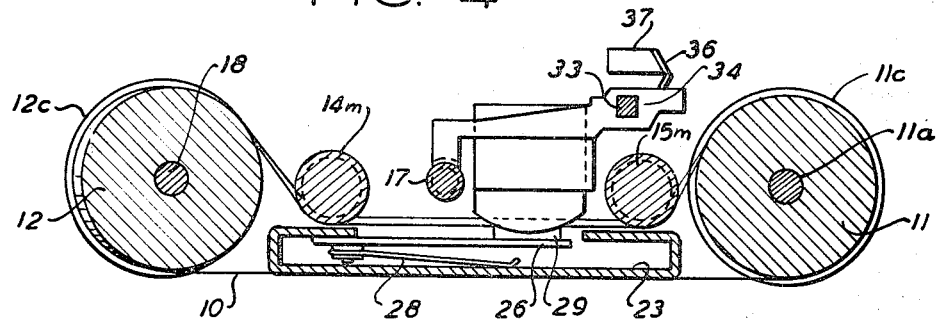
FIGURE 4 is a left-hand sectional view taken on the line 4—4 of FIGURE 5 showing a second embodiment of the invention.
Figure 5:
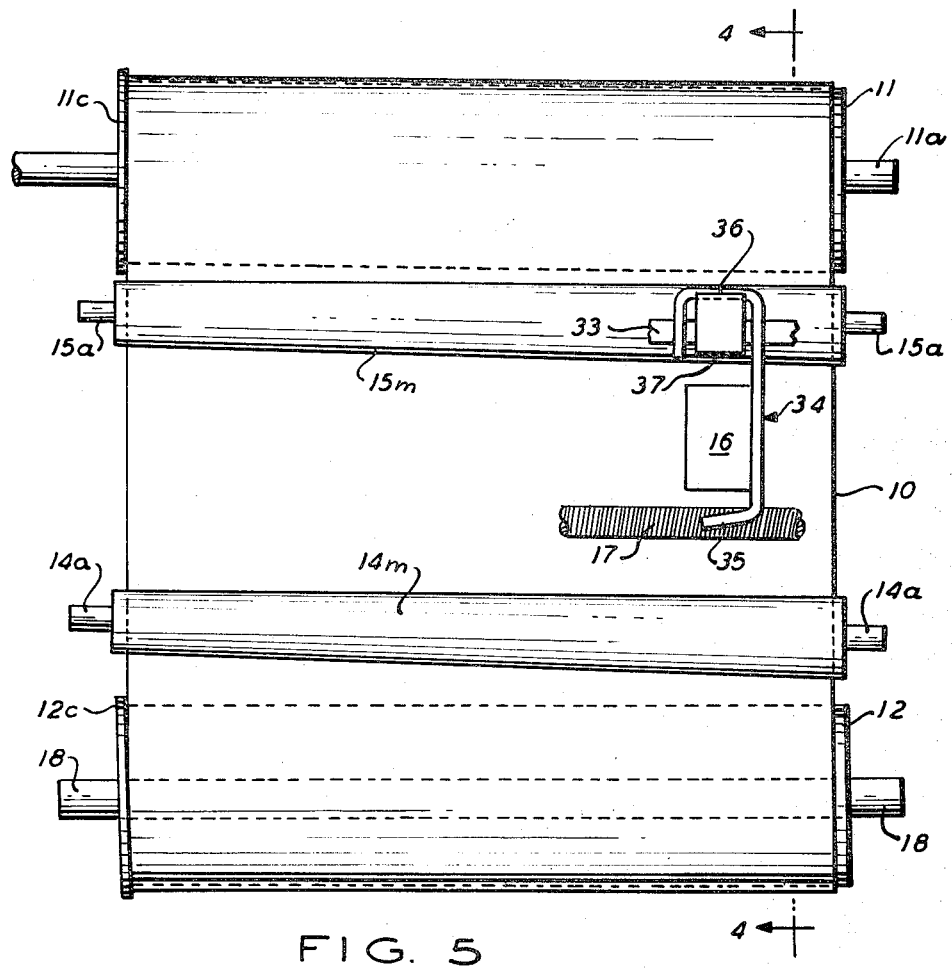
FIGURE 5 is a top plan view of the apparatus shown in FIGURE 4.

In the embodiment of the invention shown in FIGURES 4 and 5 the invention is carried out simply by tapering the two idler rollers 14m and 15m while leaving their rotation axis parallel with that of the drive roller. Since the outer ends of the idler rollers are larger in diameter they again cause the take-up roller 12 to be drawn inwardly at its outer end when the take-up roller is released and pressed by the springs 21 against the belt record. Since the inner end of the take-up roller is again a "high" end the belt record 10 tends to maintain itself in contact with the inner flange 11c regardless of which direction the belt record is driven. Although in this construction the outer end of the lower run 10a of the belt record will be lower than the inner end by the amount of taper on the idler rollers, this slight inclination of the run 10a does not require the rod 33 on which the head carriage 34 is slidingly mounted to be similarly inclined since the pad 29 maintains the belt record in a partial wrap-around relationship to the transducer head 16.

The embodiments of my invention herein particularly shown and described are intended to be illustrative and not necessarily limitative of the invention since the same is subject to changes and modifications without departure from the scope of the invention, which I endeavor to express according to the following claims.

I claim:
1. A transport mechanism for an endless flexible belt record comprising a drive roller of uniform diameter journaled on a fixed axis and having a rim flange at its inner end, means for rotating said drive roller in forward and reverse directions, a take-up roller spaced from said drive roller and having also a rim flange at its inner end, journal means at the ends of said take-up roller respectively mounted for freedom of movement in directions towards and away from said drive roller, means biasing said journal means in directions away from said drive roller to hold said belt record in a tautened condition, an idler roller between said drive and take-up rollers across which one run of said belt record is trained to cause the belt record to have a greater than fifty percent wrap-around relationship to the drive and take-up rollers, means for shifting said journal means towards said drive roller to allow a belt record to be slid onto and off from said drive and take-up rollers, said idler roller being skewed relative to said drive roller to cause the take-up roller when said shifting means is released to be constrained by the belt record in an oblique position wherein the take-up roller is inclined at its outer end towards the drive roller.

2. The transport mechanism set forth in claim 1 wherein said idler roller is of uniform diameter and is mounted in oblique relationship to said drive roller causing said take-up roller to assume an oblique position wherein the outer end thereof is closer to said drive roller than is the inner end thereof, said oblique positioning of said take-up roller causing said belt record to tend always to "shift" inwardly towards a fully mounted position defined by engagement of the inner edge of the belt record with the rim flange on said take-up and drive rollers during both forward and reverse movement of said belt record.

3. The transport mechanism set forth in claim 1 including a pair of idler rollers of uniform diameter between said drive and take-up rollers, said idler rollers being mounted in a diverging relationship to each other proceeding from the inner to the outer ends of the rollers with the idler roller adjacent to said drive roller being nearer the latter at its outer end, said diverging relationship between said idler rollers causing said biasing means to tauten said belt record with said take-up roller assuming an oblique position wherein the outer end thereof is closer to said drive roller than is the inner end thereof.

4. The transport mechanism set forth in claim 1 including a pair of idler rollers between said drive and take-up rollers, said belt record being trained around said idler rollers to cause the belt record to have more than a fifty percent wrap-around relationship with said drive and take-up rollers, said idler rollers being journaled on respective axis parallel with the journal axis of said drive roller, and said idler rollers being tapered outwardly proceeding from the inner to the outer ends thereof to cause the take-up roller to be drawn closer to the drive roller than is the outer end when the take-up roller is released to tauten the belt record.

5. A transport mechanism for an endless belt record of a thin flexible material comprising a drive roller of uniform diameter journaled on a fixed axis and having a rim flange at its inner end, means for rotating said drive roller in forward and reverse directions, a take-up roller of uniform diameter spaced from said drive roller and having also a rim flange at its inner end, journal means at the ends of said take-up roller respectively mounted for freedom of movement in directions towards and away from said drive roller, means biasing said journal means in directions away from said drive roller to hold said belt record in a tautened condition, a pair of idler rollers between said drive and take-up rollers around which one run of said belt record is trained to cause the belt record to have more than a fifty percent wrap-around relationship with said drive and take-up rollers, means for shifting said journal means towards said drive roller to allow a belt record to be slid onto and off from said rollers, and said idler rollers being skewed with respect to each other and each with respect to said drive roller whereby when said shifting means is released to allow said take-up roller to tauten the belt record responsive to said bias means the take-up roller assumes an oblique position wherein the outer end of the take-up roller is closer to said drive roller than is the inner end thereof causing said belt record to tend always to "shift" inwardly against the flanged ends of said take-up and drive rollers during both forward and reverse driven movements of said belt record.

References Cited

UNITED STATES PATENTS

| | | | |
|---|---|---|---|
| 2,797,794 | 7/1957 | Bradley | 198—202 |
| 3,029,656 | 4/1962 | Roberts | 74—241 |
| 3,029,657 | 4/1962 | Roper | 24—241 |

M. HENSON WOOD, Jr., *Primary Examiner.*

R. A. SCHACHER, *Assistant Examiner.*